United States Patent [19]
Hoffman

[11] Patent Number: 4,832,227
[45] Date of Patent: May 23, 1989

[54] SPLIT LID FOR SEWAGE BASINS
[75] Inventor: John J. Hoffman, South Bend, Ind.
[73] Assignee: Jackel, Inc., Mishawaka, Ind.
[21] Appl. No.: 235,489
[22] Filed: Aug. 24, 1988
[51] Int. Cl.4 ............................................. B65D 45/00
[52] U.S. Cl. ..................................................... 220/327
[58] Field of Search ................................. 220/315, 327

[56]  References Cited
U.S. PATENT DOCUMENTS 1,589,012  6/1926  Layton ................................ 220/327
4,113,564  9/1978  Garin et al. ..................... 220/327 X
4,600,115  7/1986  Coussau et al. ..................... 220/327

Primary Examiner—Stephen Marcus
Assistant Examiner—Nova Stucker
Attorney, Agent, or Firm—James D. Hall

[57] ABSTRACT

An improved lid for attachment to a sewage and waste water basin, which lid contains the safety provided by two sections having overlapping interlocking edges in which one section may be removed for access to the basin without the necessity of removing the other section.

3 Claims, 3 Drawing Sheets

SPLIT LID FOR SEWAGE BASINS

FIELD OF THE INVENTION

This invention relates to basins used for the collection of sewage and waste water and more particularly to an improved lid which permits ready access to the interior of such basins and which is of sufficient strength to support a substantial amount of weight.

BACKGROUND OF THE INVENTION

Sewage collection containers or basins are a necessity in many homes. Such basins are required when there is a need to pump sewage or waste water to a septic tank or to city sewer lines. Basins may be found in the basement of a home or outside of the home, and are usually located closely adjacent to a given wall between the home and the septic tank or city sewer lines. Sewage collection basins contain pumps which must occasionally be serviced, cleaned or repaired. Access to such basins is necessary in the event that they become clogged or need to be serviced. The structure and composition of such basins has evolved from hand laid concrete or brick materials to fiberglass ® plastic to structural foam. Most replacement or new waste water basins are constructed of structural foam or comparably reliable materials.

The basin is generally located underground or in the well of some type. In order to provide access to the pump located inside the basin, the lid of the basin must be exposed. In almost all instances, the lid is at the level of the basement floor or, when outside, at ground level. In such a position, the lid of the basin is subject to damage or breakage. An unwary individual or child could step on and break through the lid and fall into the waste water.

Consequently, a lid had to be developed which would provide access and which would be of sufficient strength to support a substantial amount of weight. The lid of this invention meets or exceeds all of the necessary requirements for such utility.

Other objects of this invention will become apparent upon a reading of the following description.

BRIEF DESCRIPTION OF THE DRAWINGS

A preferred embodiment of the invention has been chosen for purposes of illustration wherein.

DESCRIPTION OF THE PREFERRED EMBODIMENT

Figure 1:
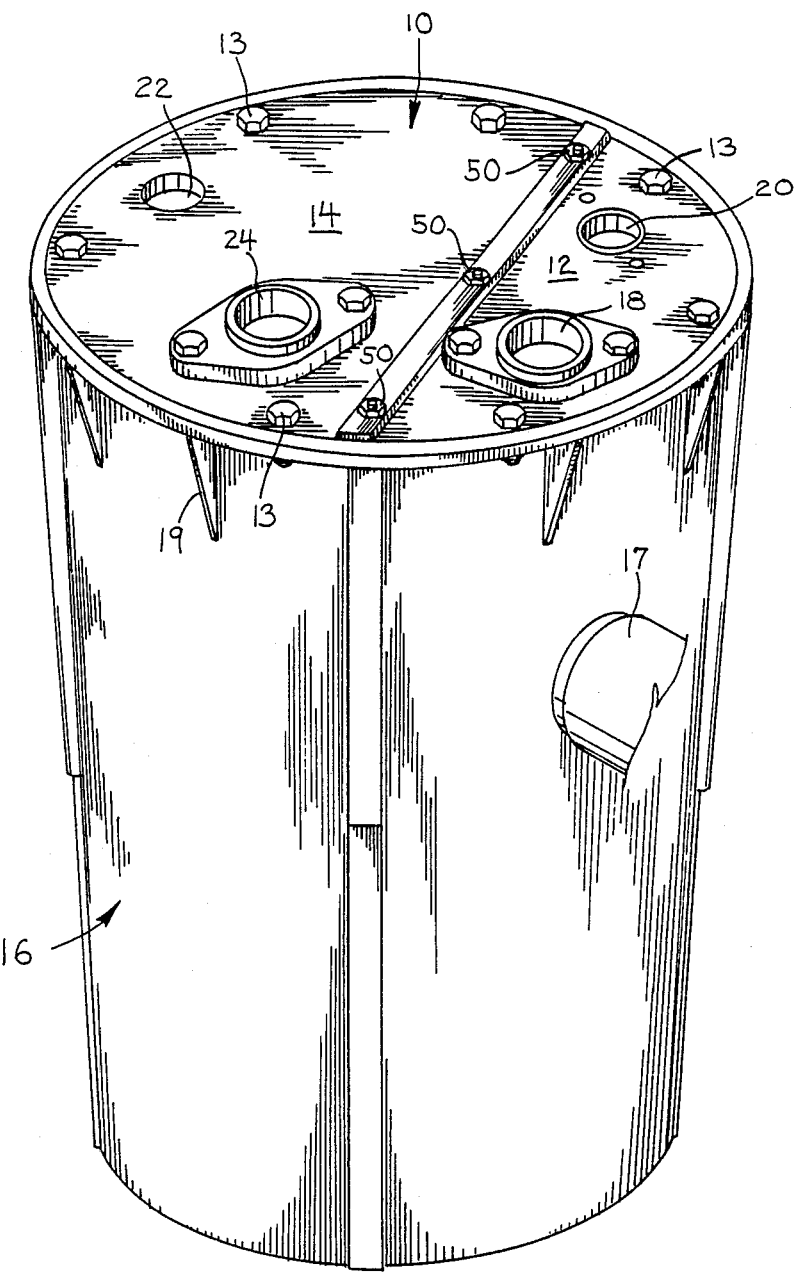
FIG. 1 is a perspective view of the split lid as positioned on top of a sewage basin.

The lid 10 of this invention is comprised of two separate interlocking sections 12, 14, both of which are fastened by suitable means, illustrated here as bolts 13 and nuts 15, to a basin 16.

The smaller section of lid 12 is normally permanently attached to basin 16. In those instances where the basin is inside a home, it is necessary to vent small lid section 12 to the outside by means of piping or tubing (not shown). Such piping or tubing is attached to small lid section 12 at opening 18. A second access opening 20, which is normally closed, is provided in lid section 12 as shown in FIG. 1.

In larger lid section 14 there are two openings 22, 24 of different diameters. The smaller opening 22 accommodates the power cord for the pump (not shown). The contents of the basin 16 are discharged through the larger opening 24, below which is found the pump and connected into which is the discharge of the pump. Piping extends from opening 24 to the septic tank or sewer lines.

Figure 3:
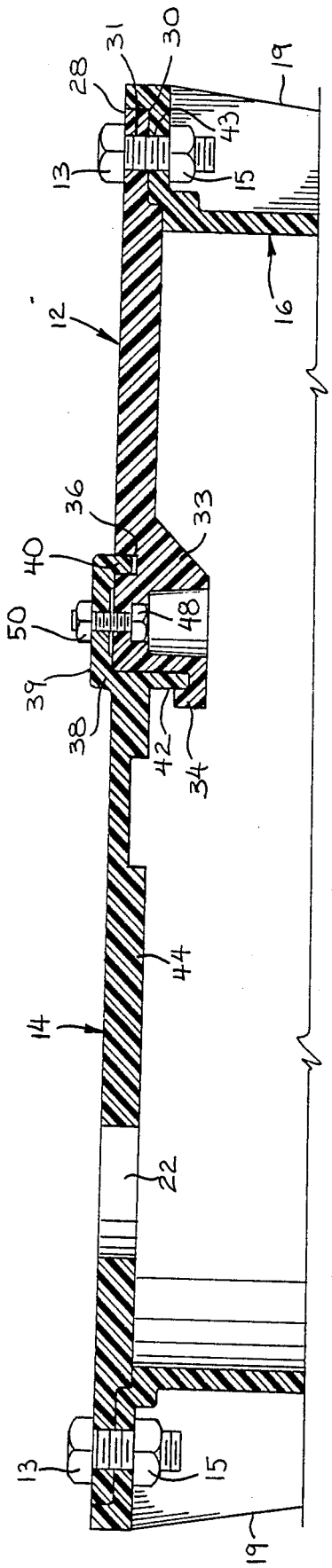
FIG. 3 is a partial sectional view of the split lid and basin.

The upper outer periphery of basin 16 is recessed to received lid 10. The edge 28 of lid 10 is formed to fit into recess 30 and includes openings 31 to accommodate bolts 13 for attachment to basin 16 as shown in FIG. 3.

Sections 12, 14 of lid 10 are provided with means for sealing and providing additional strength to the lid when assembled. Extending downwardly from the inner edge 32 of small lid section 12 is a hook or J-shaped extension 34. Inwardly spaced from edge 32 is a shallow groove 36 extending horizontally and parallel to J-shaped extension 34.

The inner edge 38 of larger lid section 14 includes an upset shoulder 39 which terminates in a downturned lip 40 which mates with shallow groove 36 in smaller lid section 12. Extending downwardly from edge 38 is a larger lip 42 which mates with J-shaped extension 34 of smaller lid section 12. The recess 30 at the top of basin 16 is formed with openings 43 to receive bolts 13.

Figure 2:
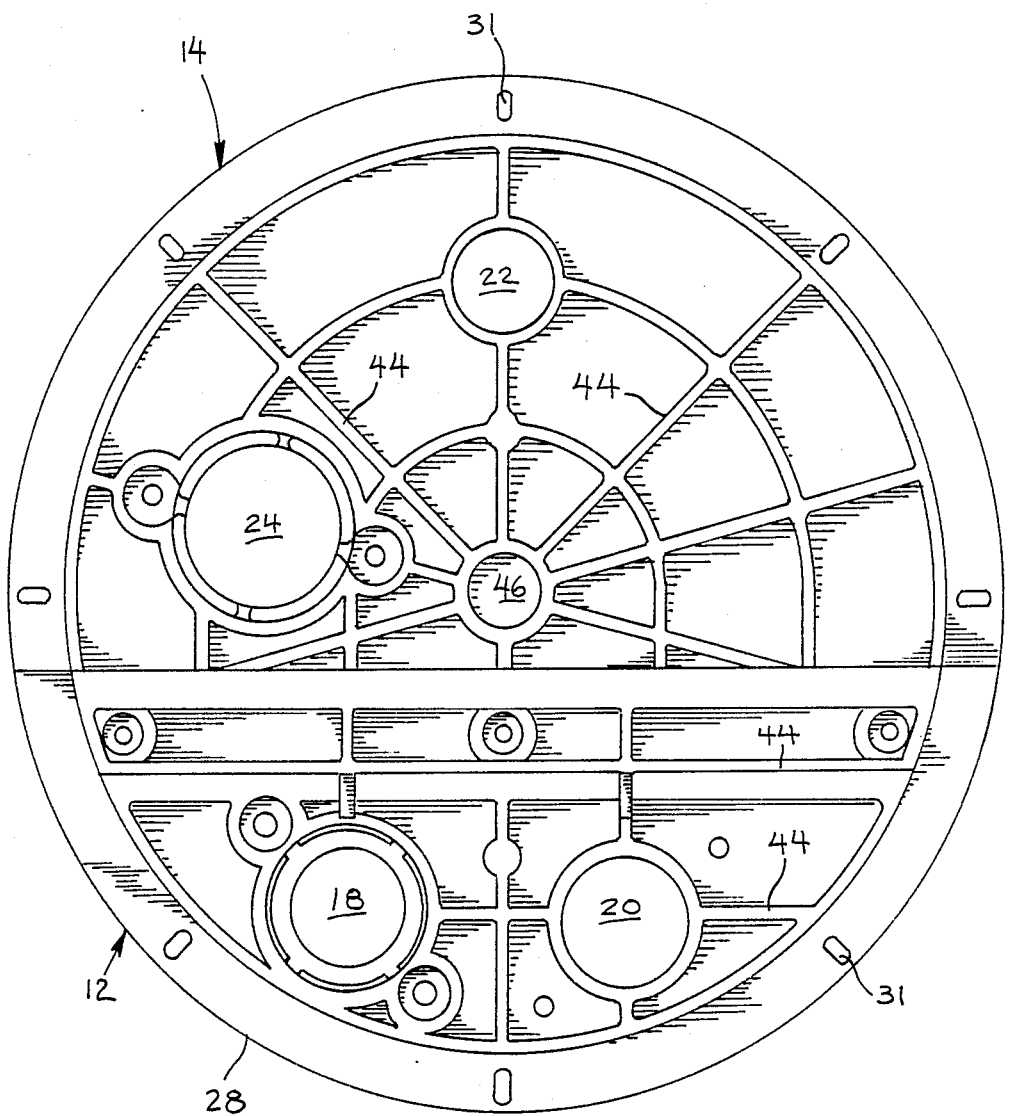
FIG. 2 is bottom view of the split lid for sewage basins.

The top of the basin is reinforced by ribs 19 to ensure structural stability. To strengthen the lid sections 12, 14, each is molded to include a series of ribs 44, as shown in FIG. 2. The ribs 44 of the larger lid section 14 extend radially and arcuately from and around the center 46 of the top of basin 16. Since larger lid section 14 covers more than half of the top of basin 16, the center 46 from which the ribs radiate is offset from its inner edge 38 and is located in the general center of lid 10. This arrangement further strengthens the structure. The ribs 44 of the smaller lid segment 12 run parallel to and laterally from its inner edge 32.

In operation, basin 16 is placed in a desired location. Piping (not shown) is connected to basin 16 at the side inlet 17. Lid section 12 is placed on the top of the basin and secured by bolts 13 and nuts 15. The venting pipe is then secured to lid opening 18.

The pump and the power cord attached to the larger lid section 14 as heretofore described is then lowered into position on basin 16. The outer edges 38 of lid section 14 fit into the recess 30 at the top of basin 16, and the downwardly protruding lips 40 and 42 are fitted into groove 36 and J-shaped extension 34 of smaller lid section 12. The lid segment 10 is then secured as shown by screws 48 and exposed nuts 50. Screws 48 are retained attached to edge 32 of lid section 12 by bonding or wedged fit.

A discharge pipe extends from the pump through opening 24 in a lid section 14. So attached, the lid 10 is of such strength as to support the weight of people or coverings such as earth. If the pump needs to be serviced, the larger lid section 14 may be readily removed without the need for loosening or removing the smaller lid section 12. The smaller lid section 12, once it is attached, need seldom be removed. Likewise, if the basin is clogged or needs cleaning, or if access is necessary for any reason, larger lid section 14 may readily be removed and reattached without disturbing smaller lid section 12 or the venting attachments.

While the preferred embodiment of this invention has been illustrated, it will be understood that changes in the structure may be made within the scope of the appended claims without departing from the spirit of the invention.

What is claimed is:

1. A lid for enclosing the top of a basin, said lid being formed of two distinct sections which overlap one over the other at adjacent edges to enclose said basin top, the improvement wherein the one lid section at its said edge includes a length-long J-shaped extension and a groove spaced away from and running parallel to said J-shaped extension, the other lid section at its said edge including two downwardly protruding parallel lips, said other lid section overlying said one lid section with said lips fitting into said J-shaped extension and groove, a fastener extending through and interconnecting said lid sections at said edges thereof.

2. The lid of claim 1 wherein said fastener is positioned between said lips.

3. The lid of claim 2 wherein said other lid section at its edge is upwardly offset between said lips to accommodate the flattened orientation of the upper surface of said one lid.

* * * * *